(12) United States Patent
Hein et al.

(10) Patent No.: US 11,221,088 B2
(45) Date of Patent: Jan. 11, 2022

(54) METHOD FOR ACTUATING A SOLENOID VALVE, AND COMPRESSED-AIR INSTALLATION COMPRISING A SOLENOID VALVE

(71) Applicant: Continental Teves AG & Co. oHG, Frankfurt (DE)

(72) Inventors: Dierk Hein, Frankfurt (DE); Patrick Wassermann, Frankfurt (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 0 days.

(21) Appl. No.: 16/545,193

(22) Filed: Aug. 20, 2019

(65) Prior Publication Data
US 2020/0056718 A1 Feb. 20, 2020

(30) Foreign Application Priority Data
Aug. 20, 2018 (DE) .................. 10 2018 213 998.9

(51) Int. Cl.
*F16K 31/06* (2006.01)
*F16K 47/00* (2006.01)

(52) U.S. Cl.
CPC .......... *F16K 31/0675* (2013.01); *F16K 47/00* (2013.01)

(58) Field of Classification Search
CPC .................. F16K 31/0675; B60G 17/0528
See application file for complete search history.

(56) References Cited

U.S. PATENT DOCUMENTS

| 5,823,640 A | 10/1998 | Eichhorn et al. |
| 6,560,088 B1 | 5/2003 | Beck et al. |
| (Continued) | | |

FOREIGN PATENT DOCUMENTS

| DE | 3216914 A1 | 11/1983 |
| DE | 19860272 A1 | 7/2000 |
| (Continued) | | |

*Primary Examiner* — Kenneth Rinehart
*Assistant Examiner* — Nicole Gardner (57) ABSTRACT

A method for actuating a solenoid valve, which is loaded with a pneumatic pressure medium, in order to reduce a pressure ($p_{sys}$) which is applied to the solenoid valve, where the solenoid valve assumes a closed switching position in the deenergized state and assumes a completely open switching position when it is energized with a switching current intensity ($I_{s(p)}$) which is dependent on the applied pressure ($p_{sys}$), where a first rise current final value ($I_1$) is predetermined, which first rise current final value is smaller than the switching current intensity ($I_{s(p)}$), where the solenoid valve is energized with an actuating current which follows an actuating current profile (SV1, SV2), and where the actuating current profile (SV1, SV2) comprises a first rise phase (TA1), in which the actuating current is increased to the predetermined first rise current final value ($I_1$), and, following said first rise phase, a first holding phase (TH1) in which the actuating current is held constant at the first rise current final value ($I_1$).

14 Claims, 3 Drawing Sheets

(56) References Cited

U.S. PATENT DOCUMENTS

| | | | |
|---|---|---|---|
| 6,676,230 B2* | 1/2004 | Kuno | B60T 8/36 |
| | | | 303/114.3 |
| 6,726,189 B2* | 4/2004 | Folchert | B60G 17/0523 |
| | | | 267/64.16 |
| 9,762,122 B2* | 9/2017 | Mizuno | H02M 3/156 |
| 10,627,006 B2* | 4/2020 | Heinrich | B60K 15/03504 |
| 2002/0136645 A1 | 9/2002 | Folchert et al. | |
| 2004/0126247 A1 | 7/2004 | Broser et al. | |
| 2017/0016552 A1* | 1/2017 | Schlick | F16K 31/0693 |

FOREIGN PATENT DOCUMENTS

| | | |
|---|---|---|
| DE | 10034243 A1 | 1/2002 |
| DE | 102010054702 A1 | 6/2012 |
| DE | 10216485 B4 | 12/2014 |
| DE | 102013016084 A1 | 4/2015 |
| EP | 0777597 B1 | 10/1998 |
| EP | 1243447 A2 | 9/2002 |
| EP | 1411244 B1 | 9/2015 |

* cited by examiner

METHOD FOR ACTUATING A SOLENOID VALVE, AND COMPRESSED-AIR INSTALLATION COMPRISING A SOLENOID VALVE

CROSS REFERENCE TO RELATED APPLICATIONS

This application is the U.S. national phase application of German Patent Application No. DE 10 2018 213 998.9, filed Aug. 20, 2018, wherein the contents of such applications are incorporated herein by reference.

TECHNICAL FIELD

A method for actuating a solenoid valve and also to a compressed-air installation comprising a solenoid valve and a control unit for carrying out the method.

TECHNICAL BACKGROUND

Nowadays, air spring systems are used for the purpose of level control of a motor vehicle and for a more comfortable ride. These compressed-air installations substantially have a compressor, which draws in air from the surrounding area via a pneumatic intake line, compresses said air and transfers said air to the respective pneumatic springs via further pneumatic lines. Furthermore, a dryer is provided between the compressor and the pneumatic springs in the line, said dryer removing moisture from the drawn-in air. An installation of this kind is known, for example, from EP 1 243 447 A2.

Now and then, compressed air is drained from the system to the surrounding area, be it in order to lower the vehicle level or simply in order to not place the compressor and other components under continuous stress, so that the stability of said system over its service life is not subject to unnecessary strain. However, system air is also released from the compressed-air installation for the purpose of regenerating the dryer or for the purpose of completely emptying said compressed-air installation. To this end, a pneumatic discharge line with a discharge valve is provided, which pneumatic discharge line is connected to the line between the compressor and the dryer or branches off from said line and leads to the area surrounding the vehicle. Secondly, the discharge line with the discharge valve can also be connected to the dryer and to an air filter which leads to the surrounding area.

Since the volume of the compressed-air installation is below a high system pressure (up to 20 bar), a first discharge surge escapes to the surrounding area when the discharge valve is opened. This produces a pop with a volume of approximately 90 dB(A). Secondary measures are taken in order to reduce or to muffle the acoustic volume of the first discharge surge.

For example, in DE 100 34 243 B4, a muffler is attached, as an additional component, to the discharge line in the direction of the atmosphere so that the development of noise is reduced. However, measures of this kind mean that additional installation space has to be provided and accordingly entail higher costs.

An electromagnetic switching valve which has the switching positions "closed" and "completely open" is generally used as the discharge valve. The solenoid valve which is closed in the deenergized state comprises an armature which is pushed against a valve seat by a spring. When said solenoid valve is energized, the armature is lifted and unblocks the opening of the valve seat, so that throughflow is produced and the pressure medium can escape. Normally, the system pressure of the compressed-air installation is applied to the valve seat and a pressure medium overflow to the surrounding area is produced via a further opening when the armature is lifted. Therefore, the atmospheric pressure is applied to the further opening in the closed state.

Valves of this kind are used as standard in the air spring systems since they can be produced at low cost and take up a very small amount of installation space. A pressure-loaded valve of this kind is known, for example, from FIG. 4 of DE 10 2010 054 702 A1. However, these switching valves cannot assume any intermediate positions of the armature stroke.

Pressure-relieved switching valves, in which the system pressure is applied firstly to the valve seat and secondly also to an opposite side of the valve armature in a further pressure chamber, constitute an extension of said type of valve. The further pressure chamber is connected to the valve seat via a pressure-relief duct. In this way, the same pressure acts on the valve armature from both sides, as a result of which pressure equalization is established. The spring which pushes the valve armature back against the valve seat is also provided in the further pressure chamber.

For sealing purposes, an encircling elastomeric seal which is in dynamic contact with the guide sleeve is provided on the valve armature. Said seal is therefore a friction seal here, which friction seal produces an additional frictional force which has to be taken into account when configuring the force for the armature stoke. At the same time, the electrical coil then also has to be larger. Accordingly, this type of valve constitutes a relatively expensive extension of the first-mentioned type of valve. A pressure-relieved valve of this kind is known, for example, from FIGS. 5 and 6 of DE 10 2010 054 702 A1.

Proportional valves constitute a further type of valve. Proportional valves can unblock the passage opening in a proportional manner and therefore regulate the throughflow quantity. This type of valve is known as a pressure control valve, for example, from DE 198 12 804 C2. However, proportional valves require complicated actuation and, on account of their system-related construction, are far more technically complicated and consequently more cost-intensive.

DE 10 2010 054 702 A1 additionally addresses the problem of reducing the pop produced during the discharge of air and, respectively, the noise pollution when venting a compressed-air installation. To this end, it is proposed to limit the switching speed of a pressure-relieved valve in such a way that the noise produced during discharge is reduced. This is achieved by way of the solenoid valve being actuated with short pulses at the beginning of a venting process, so that the valve switches only briefly and, in the process, causes limited opening of the cross section. Accordingly, only a small volume flow of the air to be vented can overflow. Since only a small quantity of air overflows in brief time intervals, the pop produced during the discharge of air is audibly reduced.

Actuation of this solenoid valve is performed using a PWM signal. The valve is actuated with short pulses in the case of which the pulse length is selected such that the magnet current reaches the switching threshold and therefore briefly switches the valve. Since said valve is a pressure-relieved valve, the current is always equal to the switching threshold. The brief pulses cause the valve to open slightly, so that a small quantity of air overflows. Owing to actuation of this kind, the system pressure is slightly reduced, so that the pop produced during the discharge of air at a high system pressure is avoided.

However, a disadvantage of this actuation of a pressure-relieved solenoid valve is that the magnet armature is completely lifted by each switching pulse and, on account of the frequent switching rate, the encircling elastomeric seal which is provided on the magnet armature is subjected to high dynamic loading. Wear of the seal is unfavorably increased owing to the continuously repeated friction with the guide sleeve.

The use temperature of the valves in compressed-air installations is −40° to 100° C. as standard. Since the sealing material changes in respect of its hardness and therefore the frictional force over the temperature range, this has to be taken into account when actuating the solenoid valve otherwise the desired acoustic effect no longer occurs. At low temperatures, the sealing elastomer contracts to a greater extent than the surrounding steel of the sleeve. Lower friction and additional leakages would be the result. Therefore, if actuation remains the same, the magnet armature performs a larger stroke and more compressed air escapes from the system. The acoustic effect in the case of the pressure-relieved valve would be lost.

In addition, the elastomeric seal is subject to wear over the service life, as a result of which the frictional forces become lower and, given the same current, the armature stroke is increased in size. Accordingly, more system air is vented and the acoustic effect is no longer present.

What is needed is a way to provide actuation of a pressure-loaded solenoid valve, which actuation audibly reduces the sound produced during the discharge of pressure medium and at the same time protects the components used in the solenoid valve against unnecessary loading and increases the stability over the service life of said pressure-loaded solenoid valve.

These and other embodiments, aspects, advantages, and features of the present invention will be set forth in part in the description which follows and will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DETAILED DESCRIPTION

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized, or structural or logical changes may be made without departing from the scope of the invention. The following detailed description is, therefore, not to be taken in a limiting sense and the scope of the invention is defined by the appended claims and their legal equivalents.

A method for actuating a solenoid valve, which is loaded with a pneumatic pressure medium, in order to reduce a pressure which is applied to the solenoid valve, where the solenoid valve assumes a closed switching position in the deenergized state and assumes a completely open switching position when it is energized with a switching current intensity which is dependent on the applied pressure, where a first rise current final value is predetermined, which first rise current final value is smaller than the switching current intensity, where the solenoid valve is energized with an actuating current which follows an actuating current profile, and where the actuating current profile comprises a first rise phase, in which the actuating current is increased to the predetermined first rise current final value, and, following said first rise phase, a first holding phase in which the actuating current is held constant at the first rise current final value. The holding phase pre-immediately follows the first rise phase, in one or more embodiments.

In order to open the solenoid valve, the magnet armature of said solenoid valve has to be moved against the spring force of its return spring. To this end, the coil of the solenoid valve is energized, as a result of which a magnetic force which attracts the magnet armature is produced. In addition, a pressure force of the pressure which is applied to the input side of the solenoid valve assists the magnet armature which likewise acts against the spring force.

The objective of the actuation is to establish a force equilibrium of the magnetic force, spring force and pressure force on the magnet armature, so that said magnet armature unblocks the valve seat at least to the extent that a pressure medium overflow can take place. This is achieved by the continuous actuation with an actuating current which lies below the switching current intensity which is required for completely opening the solenoid valve.

Therefore, the solenoid valve is advantageously energized with an actuating current which follows an actuating current profile which follows the switching current intensity. The actuating current profile initially comprises a rise phase in which the actuating current rises to a first rise current final value which lies in a determinable value range below the switching current intensity. This rise phase serves to approximate the magnetic force to the switching current intensity just enough that a force equilibrium is established at the magnet armature. While the force equilibrium is active, the valve closing body of the magnet armature has no sealing effect on the valve seat, as a result of which the pressure medium can overflow. This force equilibrium can be established reliably below the switching current intensity, so that the magnet armature is lifted or its valve closing body becomes slightly detached from the valve seat only to such an extent that the pressure medium overflow takes place here. Since the magnet armature is not completely open, this slight pressure medium overflow is understood as a leakage.

On account of the pressure medium overflow, the pressure which is applied to the solenoid valve is reduced. Therefore, the assisting pressure force becomes smaller, as a result of which the magnetic force which is to be produced has to be increased in a proportional manner. Consequently, over the total function time of the actuating current profile, the switching current intensity increases continuously as the preliminary pressure is reduced. Therefore, the switching current intensity is dependent on the pressure which is applied to the solenoid valve.

In order that the intended leakage can take place over a relatively long period of time, a holding phase which follows on from the rise phase is provided. During this holding phase, the actuating current remains constant at the first rise current final value. A slight deviation in the actuating current during this holding phase by 1% to 2% of the first rise current final value is substantially considered to be constant. On account of the resulting falling pressure, the magnet armature is lowered onto the valve seat and the sealing effect is provided again.

Furthermore, the method renders it possible to use the cost-effective pneumatically pressure-loaded solenoid valves and in the process to allow a defined pressure medium overflow. In this way, relatively expensive solutions, such as pressure-relieved valves or proportional valves, can be dispensed with.

In one or more embodiments, the first rise current final value is determined depending on the pressure which is applied to the solenoid valve. A pressure measurement can be performed by a provided pressure sensor during operation of the solenoid valve. By virtue of measuring the pressure which is currently applied to the solenoid valve, a stored pressure/actuating current value table can be used to ascertain the first rise current final value required at this time in order to produce the required force equilibrium.

Prior to commissioning a series of valves, a preliminary pressure is applied to the solenoid valve in a plurality of test runs. Owing to an increasing energization of the coil with an actuating current, the magnet armature moves to its completely open position at some point. At this time, the preliminary pressure which is applied to the solenoid valve drops abruptly, this being monitored by a pressure measurement. This procedure is carried out for different preliminary pressures. Consequently, the switching current intensity which is applicable to individual preliminary pressure values can be determined for said individual preliminary pressure values in the process. Rise current final values, which lie below said switching current intensity, are determined on the basis of said switching current intensity. The rise current final value is to be selected in such a way that it does not result in switching of the solenoid valve since, otherwise, the magnet armature would be completely lifted and the discharge surge would begin prematurely. The level of said rise current final values is typically 80% to 98% of the switching current intensity. The exact level of the rise current final values is also dependent on the respective valve construction since friction, moving masses and the quality of the sealing rubber influence the force equilibrium and consequently the intended pressure medium overflow.

A measurement of the pressure which is applied to the solenoid valve is performed at the beginning of the actuating current profile and/or during the holding phase. By virtue of measuring the pressure at the beginning of the actuating current profile, the first rise current final value which is currently required can advantageously be determined using the table and therefore targeted actuation of the solenoid valve can take place. Knowing the pressure which acts on the solenoid valve at the beginning of the actuating current profile allows the actuating current to be increased precisely such that the solenoid valve is not completely opened but the force equilibrium at the magnet armature is established and the intended pressure medium overflow can take place directly.

The pressure measurement during the holding phase provides information about the extent to which the pressure which is currently applied to the solenoid valve has already dropped or reduced. In one or more embodiments, the pressure measurement takes place shortly before the end of the holding phase.

In one or more embodiments, the first rise current final value is prespecified. If no pressure measurement is provided during operation and therefore the pressure which is applied to the solenoid valve is not known, the first rise current final value is defined beforehand. This rise current final value lies significantly below the switching current intensity which is required in the case of a maximum system pressure (and therefore a maximum pressure force). The prespecification for the rise current final value lies, for example, in a value range of between 80% and 95% of the switching current intensity. The current intensity for this initial rise current final value, which is required for the force equilibrium, lies at 0.8 A by way of example. For a minimum system pressure, said value lies at 1.9 A by way of example. Said values apply for a specific series of valves. Other series of valves with other coil configurations require other current intensities.

In one or more embodiments, the actuating current is increased in a linear manner or in an abrupt manner during the first rise phase. The linear rise in the actuating current in the first rise phase approximates the first rise current final value over a certain time period. This is supposed to have the effect that the first rise current final value is also reached in an accurate manner and there is no excessive control.

Secondly, the total function time of the actuating current profile can be shortened by way of the actuating current of the first rise phase rising to the first rise current final value in an abrupt manner. The actuating current is quickly increased in such a way that it behaves in the form of a jump. However, there is a risk here of the actuating current swinging beyond the first rise current final value. Therefore, care should be taken that the first rise current final value lies significantly below the switching current intensity in such a way that the solenoid valve is not unintentionally opened. The abrupt rise in the actuating current is used, for example, when the applicable switching current intensity is known on the basis of a measurement of the pressure which is currently applied having taken place, and therefore a safer first rise current final value can be selected.

In one or more embodiments, the duration of the first rise phase and of the first holding phase is predetermined. The length of the rise phase and holding phase is to be matched to the respective valve construction. By way of example, the duration of the rise phase lies between 1 ms and 100 ms and the duration of the holding phase lies between 100 ms and 5000 ms. In particular, the duration of the holding phase determines how much pressure medium can overflow. The duration for which the pressure medium overflow in the rise phase and holding phase takes place is dependent on the nominal valve width and the resulting circumference of the valve seat. In the case of a relatively large circumference, there is a larger pressure medium overflow per unit time given the same pressure. The rubber seal used of the valve closing body also influences the pressure medium overflow. A soft rubber provides better sealing than a hard rubber given the same force. Therefore, the time-related parameters of the phases are each matched to the valve used by way of previous test runs.

In one or more embodiments, the actuating current profile comprises a second rise phase which follows the first holding phase. A second rise phase takes place in order to cause a further pressure medium overflow and therefore to further reduce the pressure which is applied to the solenoid valve. The second rise phase is also required, for example, when no pressure medium overflow has taken place during the first rise phase because the first rise current final value had been selected to be low in such a way that no force equilibrium has become established and therefore no pressure medium overflow has taken place either.

In one or more embodiments the actuating current is increased to a determinable second rise current final value during the second rise phase. In order to ensure a pressure medium overflow, the actuating current increases to a second rise current final value in the second rise phase. Said second rise current final value is greater than the first rise current final value and smaller than the switching current intensity. By way of example, the pressure measurement during or at the end of the first holding phase is useful for determining that the second rise current final value is definitively smaller than the switching current intensity. Before the actuating current is increased in the second rise phase, the pressure measurement provides information about the pressure which is applied to the solenoid valve. Consequently, a value for the second rise current final value can be ascertained using the pressure/actuating current value table.

If a pressure measurement is not provided, the second rise current final value is likewise prespecified. This is determined on the basis of empirical values for the series of valves used, in the case of which it can be ensured that, after the time period of the first rise phase and holding phase, the applied pressure was reduced only to such an extent that the value of the second rise current final value does not lead to switching of the solenoid valve.

The actuating current profile comprises a second holding phase which follows the second rise phase and in which the actuating current is held constant at the second rise current final value, where the second rise current final value is smaller than the switching current intensity.

Owing to an actuation method of this kind with alternating rise phases and holding phases, the continuously rising switching current intensity is followed to a certain extent. Owing to the resulting leakage, the pressure at the solenoid valve gradually is reduced. Therefore, the pressure which is applied to the solenoid valve is advantageously not reduced suddenly, but rather continuously drops in the actuating phases. As a result, the sound produced by the first pressure medium discharge surge when the solenoid valve is completely opened is no longer critical.

As an alternative, the actuating current is increased to the switching current intensity in a linear manner or in the form of a jump during the second rise phase. Owing to the rising actuating current to the switching current intensity, the magnet armature is completely lifted and the solenoid valve opens, so that the pressure which is applied to the solenoid valve can be completely reduced. The resulting pop during the discharge of air is so quiet that the sound of said pop is no longer found to be disturbing, for example at 65 dB(A). The rise to the switching current intensity is also called the residual current rise and takes place when the applied pressure has already been reduced to such an extent that the solenoid valve can be completely opened. This takes place, for example, due to a linear rise in the actuating current or due to an abrupt rise if, for example, the total function time of the actuating current profile should be kept short.

In one or more embodiments, the actuating current profile is superimposed with an additional signal profile (dither). This signal profile is sinusoidal in one or more embodiments. By virtue of the additional signal, the magnet armature can be moved to a permanently excited state in order to generate extremely small movements (dither) and therefore to avoid static friction. Therefore, the magnet armature should become detached from the valve seat more easily.

The method is carried out in a compressed-air installation comprising a solenoid valve and a control unit. In one or more embodiments the compressed-air installation operates in the closed air supply mode.

The method is particularly suitable for discharging the pressure in the compressed-air installation via a discharge valve, so that the sound produced during the discharge of air does not exceed an acoustic limit value and is not found to be disturbing.

Therefore, according to a further preferred embodiment, the compressed-air installation comprises an air compressor and at least one pressure medium chamber, where the pressure medium chamber is connected to the air compressor via a pneumatic main line, where the main line is connected to an air discharge line which comprises a discharge valve, where the solenoid valve is embodied as the discharge valve.

The system pressure of the compressed-air installation is preferably applied to an input side of the solenoid valve.

There is particularly preferably no muffler. On account of the method according to the invention being advantageous in respect of the sound of the compressed-air installation during the discharge of air, expensive mufflers which take up installation space can be dispensed with.

Figure 1:
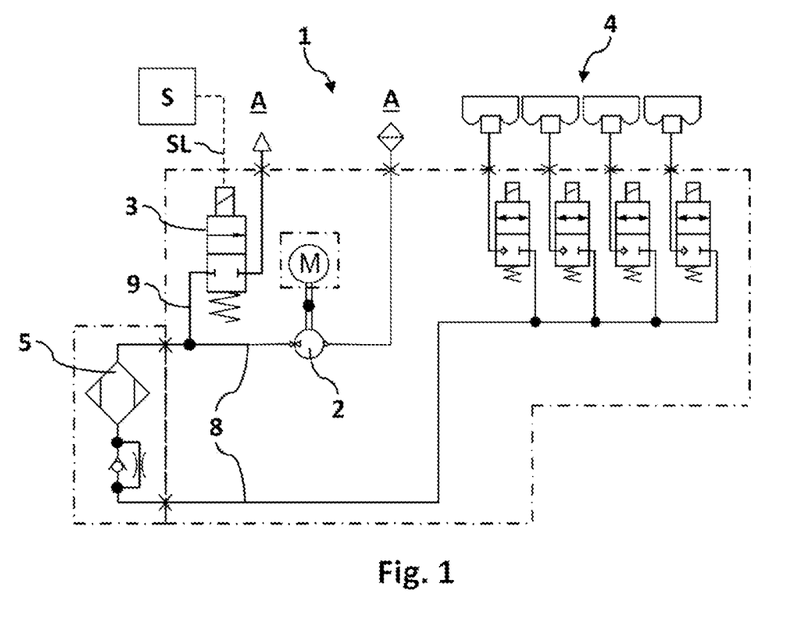
FIG. 1 shows a pneumatic circuit diagram of an open compressed-air installation, in accordance with one or more embodiments.

FIG. 1 shows a first pneumatic circuit diagram of a compressed-air installation 1 in the form of an air spring system. The compressed-air system 1 comprises an air compressor 2 which is driven by a motor M. Four air springs 4, which are each associated with a vehicle wheel of the motor vehicle as pneumatic control units, are schematically illustrated as pressure medium chambers. Air springs 4 are connected to the pressure side of the air compressor 2 via respective valves and a pneumatic main line 8. The intake side of the air compressor 2 is connected to the atmosphere A or to the area surrounding the vehicle via a line, so that the air compressor 2 can draw in air from the surrounding area in this way. This drawn-in air is dried by an air dryer 5 which is provided in the main line 8, that is to say the moisture in the air is adsorbed. The dried air is transferred to the air springs 4 by virtue of the compressor running, for the purpose of level control of the vehicle. A manner of operation of this kind is understood to be open air supply (OAS).

It is occasionally necessary for the saturated air dryer 5 to be regenerated, and to this end compressed air flows in counterflow to said air dryer from the air springs 4 via the main line 8, so that the through-flowing compressed air can absorb moisture from the air dryer 5. This compressed air is discharged to the atmosphere A or surrounding area via a discharge line 9, where the discharge line 9 is connected to the main line 8 between the air compressor 2 and the air dryer 5 or branches off from said main line. In order that compressed air cannot escape from the system via the discharge line 9, a discharge valve 3 which is closed in the deenergized state is provided in said discharge line. In order that compressed air or system air can be discharged from the installation in a controlled manner, the discharge valve 3 is actuated by a control unit S via a signal line SL, so that the discharge valve 3 opens and unblocks the discharge line 9 when it is energized. The discharge line 9 is also unblocked by the discharge valve 3 for the purpose of completely emptying the system.

During discharge or venting of system air, an acoustic noise or a pop is generally produced, this generally being found to be unpleasant. Therefore, this acoustic disturbance should be kept as small as possible.

Figure 2:
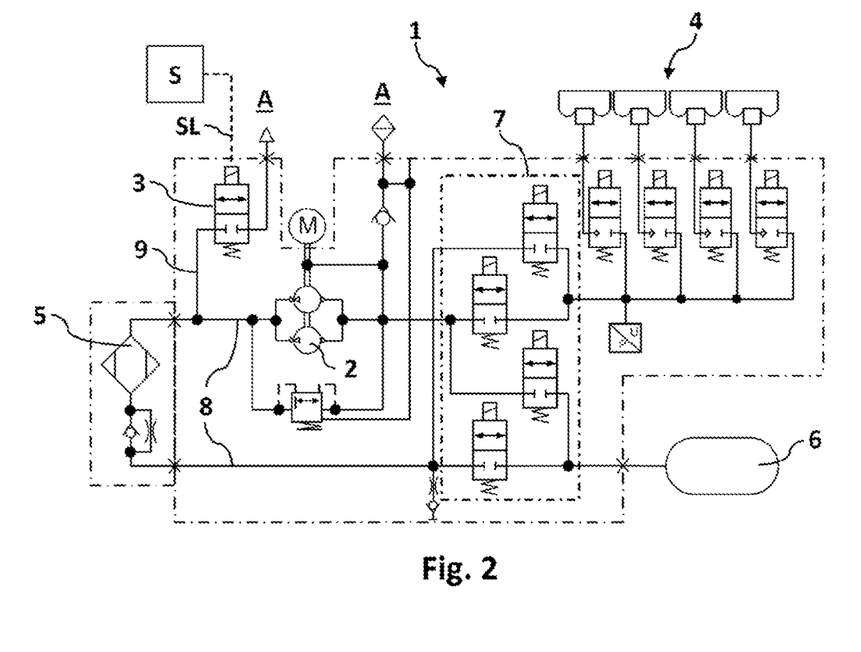
FIG. 2 shows a pneumatic circuit diagram of a closed compressed-air installation, in accordance with one or more embodiments.

FIG. 2 shows a modification to the compressed-air installation 1 by way of a second pneumatic circuit diagram. The compressed-air installation 1 comprises additional elements, such as a pressure accumulator 6 and a switchover valve device 7. The pressure accumulator 6 is designed as a further pressure medium chamber in order to store highly compressed air and to release said highly compressed air as required. To this end, a switchover valve device 7 is required which comprises four 2/2 way valves in order to render possible and, respectively, to switch different pneumatic connections between the air compressor 2, the air springs 4 and the pressure accumulator 6. Furthermore, a pressure sensor is further provided in order to be able to determine the system pressure which is applied to the air springs 4.

The additional pressure accumulator 6 and the switchover valve device 7 allow, for example, control processes to be performed in the air springs 4, without the air compressor 2 having to draw air in from the surrounding area. In order to lift the vehicle, it is firstly possible to transfer compressed air from the air springs 4, via the compressor 2, to the pressure accumulator 6 or to compress said compressed air with the aid of the compressor 2. In the case of a corresponding pressure difference between the compressed air of the pressure accumulator 6 in relation to the air springs 4, that is to say with a high pressure level in the pressure accumulator 6 relative to a low pressure level in the air springs 4, it is also possible for compressed air to overflow from the pressure accumulator 6, via the switchover valve device 7, to the air springs 4, without leaving the compressor 2 running, in order to lift, for example, the vehicle structure. This manner of operation is also called closed air supply (CAS).

Analogously to the open compressed-air installation of FIG. 1, the closed compressed-air installation 1 has a discharge line 9 with a discharge valve 3 for venting purposes, wherein the discharge valve 3 can be switched by a control unit S with a signal line SL. The discharge pop during venting should be kept as low as possible here too. This is necessary, for example, when the quantity of air in the closed system has increased too much due to heating.

Figure 3:
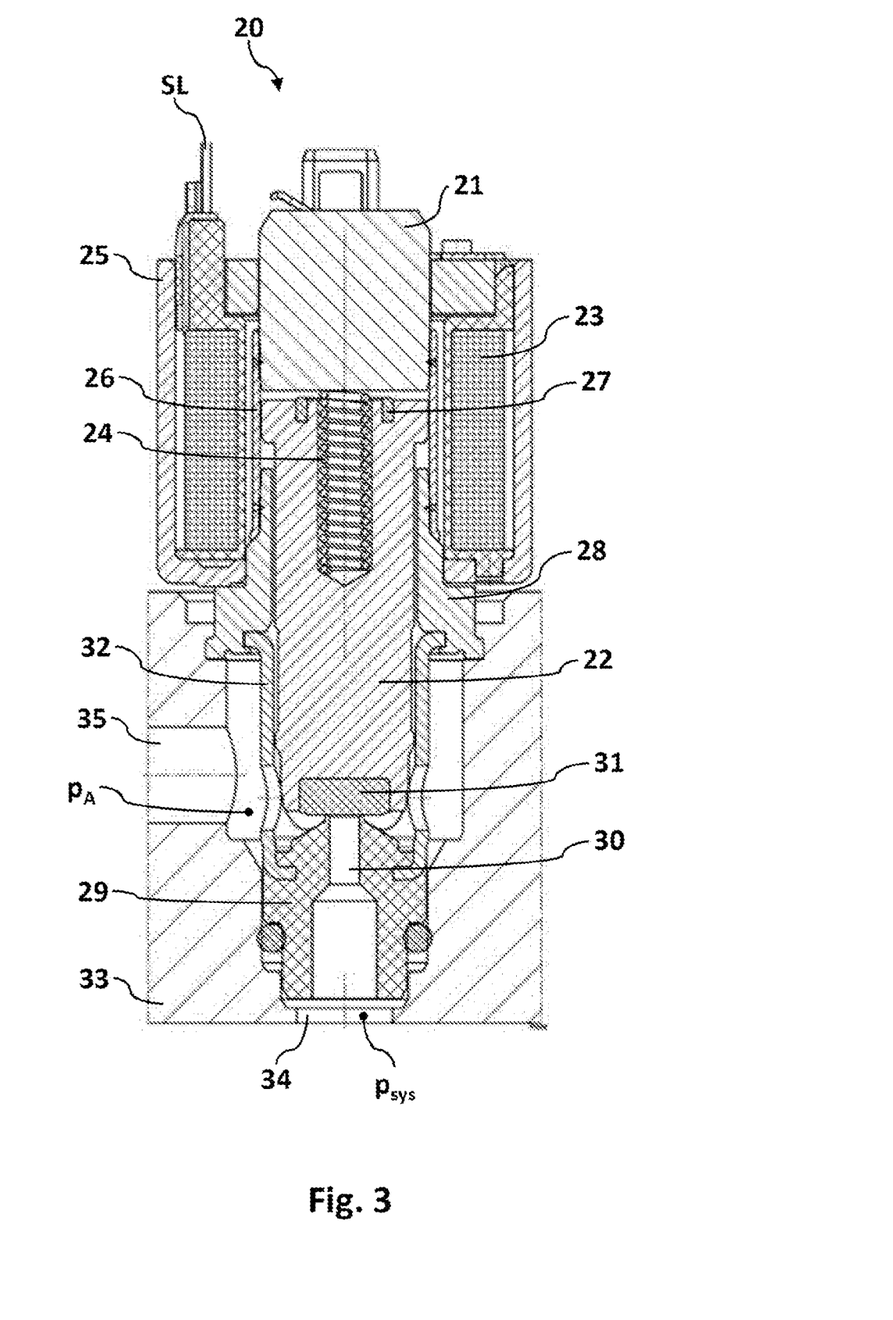
FIG. 3 shows a pressure-loaded solenoid valve, in accordance with one or more embodiments.

The discharge valve used in the compressed-air installations of FIGS. 1 and 2 is realized according to FIG. 3 as a pneumatically pressure-loaded solenoid valve 20.

The basic structure of the solenoid valve 20 is such that it comprises, as the housing, a yoke body 25 which is connected to a valve receiving apparatus 33 by means of a yoke ring 28. In the interior of the yoke body 25, a cylindrical magnet sleeve 26 is pushed onto the yoke ring 28, a stopper-like magnet core 21 being surrounded by said magnet sleeve. A piston-like magnet armature 22 which is loaded by a return spring 24 is arranged in a movable manner within the magnet sleeve 26 and the yoke ring 28. The return spring 24 is arranged in a central bore of the magnet armature 22 and is supported, as a compression spring, on that surface of the magnet core 21 which faces the magnet armature 22. For the purpose of stop damping, a damper element 27 relative to the magnet core 21 is provided on the magnet armature 22. A coil 23 which can be energized via a signal line SL is provided around the magnet sleeve 26 within the yoke body 25.

The magnet armature 22 extends further into a valve sleeve 32 which is connected to the yoke ring 28 by way of an upper end. The yoke ring 28 together with the valve sleeve 32 are, for this purpose, inserted into a receiving bore of the valve receiving apparatus 33. A valve seat 29 which is connected to the lower end of the valve sleeve 32 is also enclosed within said bore. The valve sleeve 32 has a plurality of openings, which serve for pressure medium overflow, in the circumferential direction. The valve seat 29 has a passage bore 30 which is closed by the magnet armature 22 by way of an applied sealing element as a valve closing body 31. The sealing element constitutes a static seal on the valve seat 29 and is inserted into a recess, which is provided for this purpose, of the magnet armature 22.

The solenoid valve 20 serves to connect and, respectively, to disconnect an input side 34 and an output side 35 in the valve receiving apparatus 33. The input 34 is configured as a bore in the valve receiving apparatus 33 and opens out in the passage bore 30 of the valve seat 29. The compressor, not illustrated, and, respectively, the pressure medium chambers are connected to the discharge line of a compressed-air installation by the input 34. The output 35 leads, as a bore, out of the valve receiving apparatus 33 to the surrounding area. Therefore, the system pressure $p_{sys}$ is applied to the input side 34 and the atmospheric pressure $p_A$ at the solenoid valve 20 is applied to the output side 35. Since the system pressure acts on the magnet armature 22 only on the input side 34, the solenoid valve 20 is a pressure-loaded valve.

In the illustrated form, the magnet armature 22 of the solenoid valve 20 is in the closed position or in the basic position in the deenergized state and therefore closes the opening cross section of the valve seat 29. When the coil 23 is energized with a switching current, the magnet armature 22 undergoes an armature stroke in the direction of the magnet core 21, so that the opening cross section of the valve seat 29 is unblocked. Therefore, the solenoid valve 20 is in the completely open position. Here, pressure medium overflow takes place from the input side 34 to the output side 35. The throughflow quantity is determined by the switching duration of the armature stroke. If the energization is lifted, the magnet armature 22 drops on account of the return force of the spring 24 and said magnet armature presses on the valve seat 29. Here, the spring force has to correspond to the maximum system pressure $p_{sys}$, so that the magnet armature 22 is not unintentionally lifted by the system pressure $p_{sys}$. Secondly, the magnetic force of the coil 23 has to be dimensioned such that the spring force of the return spring 24 can be overcome and the magnet armature 22 is lifted to the opened position.

The valve receiving apparatus 33 can be, for example, an aluminum block which represents the housing of an air compressor and at the same time has drilled ducts as a pneumatic connecting line to a plurality of pressure medium chambers.

Figure 4:
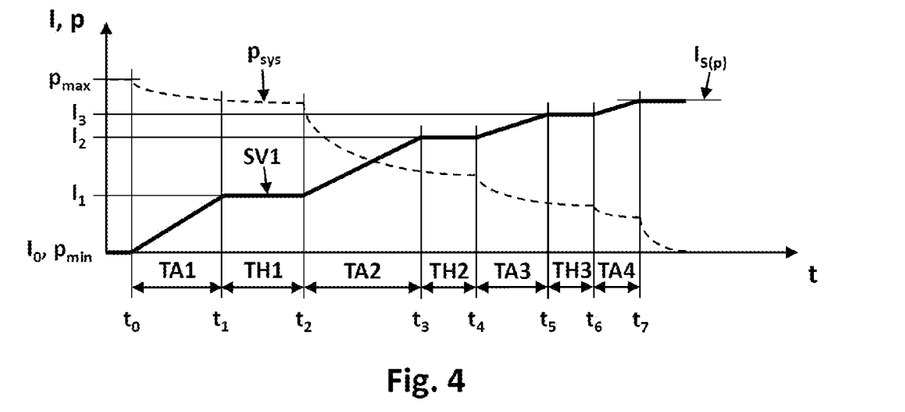
FIG. 4 shows a first exemplary embodiment of an actuating current profile, in accordance with one or more embodiments.

FIG. 4 shows a first exemplary embodiment of an actuating current profile SV1 for actuating a solenoid valve. The time t is plotted along the abscissa and the ordinate indicates the current value I and also the pressure p which is applied to the solenoid valve. The solid line shows the profile of the actuating current SV1 and the dashed line indicates the system pressure $p_{sys}$ which is applied to the solenoid valve.

The solenoid valve which is closed in the deenergized state unblocks the opening cross section of the valve seat when the coil of said solenoid valve is energized with a switching current $I_S$, on account of the magnet armature being lifted by the resulting magnetic force. The pressure force of the system pressure which acts on the magnet armature assists the magnetic force for lifting said magnet armature. As the pressure on the solenoid valve falls, the assisting pressure force drops, as a result of which the magnetic force required for completely opening the magnet armature has to be increased. Therefore, a greater switching current intensity $I_S$ is required at a relatively low system pressure than at a high system pressure. Therefore, in the case of pressure-loaded valves, the switching current intensity $I_S$ which is required for complete opening is always dependent on the pressure which is applied to the solenoid valve at a specific time. Therefore, reference sign $I_{S(p)}$ for the pressure-dependent switching current intensity $I_s$, which changes in the time profile of the actuating current SV1, increases in particular in the case of a falling system pressure $p_{sys}$.

The example proposes an actuating current profile SV1 which is intended to follow the switching current intensity $I_{S(p)}$, while a pressure drop in the system pressure $p_{sys}$ which is applied to the solenoid valve is intended to be achieved. The actuating current profile SV1 comprises several actuating phases which each comprise a rise phase with a following holding phase. During a rise phase, the actuating current is increased to a rise current final value which always lies below the switching current intensity $I_{S(p)}$. This actuation of the solenoid valve is intended to lead to slight lifting of the magnet armature, as a result of which a certain pressure medium overflow can take place, so that pressure medium is removed.

In order to allow the pressure medium overflow to take place in the intended quantity, a holding phase is provided following the rise phase. In said holding phase, the rise current final value is held constant over a certain time period, so that further quantities of pressure medium overflow during the holding phase. On account of the system pressure $p_{sys}$, which drops in the process, the pressure force which assists the magnet armature is also reduced, as a result of which the magnet armature is lowered slowly back onto the valve seat and suppresses the pressure medium overflow.

For the purpose of further reducing the system pressure $p_{sys}$, the actuating phases are repeated, where the actuating current is continuously increased further. A time starting from which the solenoid valve can be completely opened is reached. This time occurs when the system pressure $p_{sys}$ has reached a certain pressure value starting from which complete opening of the solenoid valve does not lead to a discharge pop which is generally found to be disturbing. At this time, the system pressure $p_{sys}$ has already dropped to such an extent that the solenoid valve can be readily completely opened and the sound which is produced by the discharge of air is not further disturbing.

Therefore, for the purpose of completing the actuating current profile SV1, the actuating current is increased by a residual current rise to the currently applicable switching current intensity $I_{S(p)}$ which depends on the system pressure $p_{sys}$, which is applied at this time, and leads to complete opening of the magnet armature.

Specifically, the profile SV1 according to the example is broken down as follows. A first rise phase TA1 takes place at the beginning of the actuating current profile SV1 starting from a start time $t_0$. In this first rise phase TA1, the actuating current rises in a linear manner from 0 A to a determinable first rise current final value $I_1$ until a first time $t_1$. Said first rise current final value $I_1$ is held constant starting from the first time $t_1$, over a first holding phase TH1, until a second time $t_2$. A slight drop in the system pressure $p_{sys}$ can already take place in this first actuating phase.

In the further profile, the first holding phase TH1 is followed by a second rise phase TA2 starting from the second time $t_2$ until a third time $t_3$. In the second rise phase TA2, the actuating current further rises in a linear manner from the first rise current final value $I_1$ to a second rise current final value $I_2$. Subsequently, the second rise current final value $I_2$ is held constant in a second holding phase TH2 until a fourth time $t_4$. A significant drop in the system pressure $p_{sys}$ takes place in this second actuating phase.

There then once again follows a further actuating phase with a third rise phase TA3 in which the actuating current is increased from the second rise current final value $I_2$ to a third rise current final value $I_3$ until a fifth time $t_5$. During a subsequent third holding phase TH3, the third rise current final value $I_3$ is held constant until a sixth time $t_6$. A further drop in the system pressure $p_{sys}$ also takes place here.

For example, the system pressure $p_{sys}$ has dropped to such an extent in the third actuating phase that complete opening of the solenoid valve will not lead to an unpleasant discharge pop. Therefore, as the last actuating phase, the actuating current can be increased to the switching current intensity $I_{S(p)}$, which is reached at a seventh time $t_7$, in a fourth rise phase TA4. The magnet armature is lifted to its completely open position only when said switching current intensity $I_{S(p)}$ is reached or exceeded.

Actuating the solenoid valve with certain actuating current values below the switching current intensity $I_{S(p)}$ has the effect that the magnet armature is lifted only to such an extent that a leakage takes place at the valve seat. This slight lifting of the magnet armature leads to an intended leakage at the sealing point of the valve seat but not to complete switching of the valve. That is to say, the rising actuating current during the rise phases releases the valve closing body from the valve seat in a targeted manner, so that the opening cross section of the valve seat is slightly unblocked.

In the following holding phase, the magnet armature is held in this position, so that the leakage continues to take place. Therefore, a pressure medium overflow can take place during a holding phase, as a result of which the system pressure $p_{sys}$ is reduced and therefore the pop produced during discharge of air is reduced when the magnet armature is completely opened.

The actuating current profile SV1 is employed, for example, when there is a maximum system pressure $p_{max}$. The actuating current begins at 0 A and runs through the actuating current profile SV1 with several rise phases and holding phases in which the rise current final values are smaller than the switching current intensity $I_{S(p)}$ which is dependent on the system pressure $p_{sys}$. A boundary condition is that the switching current intensity $I_{s(p)}$ should never be exceeded and nevertheless an actuating current which leads to a movement of the magnet armature, so that a pressure medium overflow takes place as a leakage, should be applied.

Figure 5:
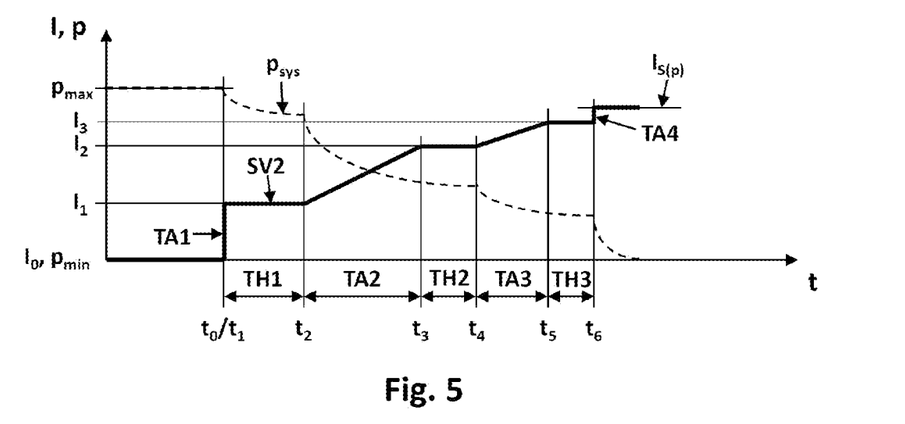
FIG. 5 shows a second exemplary embodiment of an actuating current profile, in accordance with one or more embodiments.

FIG. 5 shows a second exemplary embodiment of an actuating current profile SV2 for actuating a solenoid valve. The current values I and pressure values p are plotted with respect to time t here too. Like FIG. 4, said FIG. 5 shows the actuating current profile SV2 as a solid line and the system pressure $p_{sys}$ which is applied to the solenoid valve as a dashed line.

The actuating current profile SV2 likewise comprises several actuating phases which each comprise a rise phase and a holding phase during which the actuating current rises to and is held at a determinable rise current final value.

In order to shorten the total time of the actuating current profile SV2, a jump-like rise to a first rise current final value $I_1$ takes place as a first rise phase TA1 starting from a start time $t_0$. Since said first rise current final value $I_1$ is reached directly without any appreciable time period, the rise in the actuating current is represented in the form of a jump. Consequently, the first time $t_1$, at which the first rise current final value $I_1$ is reached, can also be considered to be the start time. Owing to energization with the first rise current final value $I_1$, the magnet armature is slightly lifted, so that a pressure medium overflow can take place for the purpose of leakage. This pressure medium overflow also takes place in the subsequent first holding phase during which the first rise current final value $I_1$ is held constant until a second time $t_2$.

Starting from the second time $t_2$, a linear rise in the actuating current to a second rise current final value $I_2$ until a third time $t_3$ is reached takes place in a second rise phase TA2. A significant drop in the system pressure $p_{sys}$ takes place as early as during the second rise phase TA2. In order that this can continue to take place, there follows a second holding phase TH2, during which the second rise current final value $I_2$ is held constant, until a fourth time $t_4$.

For the purpose of a further drop in pressure, there follows a third actuating phase comprising a third rise phase TA3 starting from the fourth time $t_4$ with a linear rise in the actuating current to a third rise current final value $I_3$ and, starting from a fifth time $t_5$, a third holding phase TH3 until a sixth time $t_6$, wherein the third rise current final value $I_3$ remains constant.

If, for example, during said third actuating phase, the system pressure $p_{sys}$ has fallen below a critical pressure value, the solenoid valve can be completely opened. Therefore, there follows at the sixth time $t_6$ a residual current jump to the switching current intensity $I_{S(p)}$ as the last and fourth rise phase TA4. The duration of said actuating current rise is also so short that the fourth rise phase TA4 is represented in the form of a jump. The residual current jump to the switching current intensity $I_{S(p)}$ leads to complete opening of the solenoid valve and therefore completes the second actuating current profile SV2.

The actuating current profile SV2 is used, for example, when the system pressure $p_{sys}$ has already been reduced in such a way that the total function time can be shortened.

The actuating profiles, according to the example, of FIGS. 4 and 5 preferably serve for controlling a solenoid valve, which is used as a discharge valve, in a compressed-air installation in order to discharge compressed air and to reduce the system pressure in such a way that a reduction in the sound produced during the discharge of air takes place in the process. To this end, the actuating profiles are stored in a control unit of the compressed-air installation.

Figure 6:
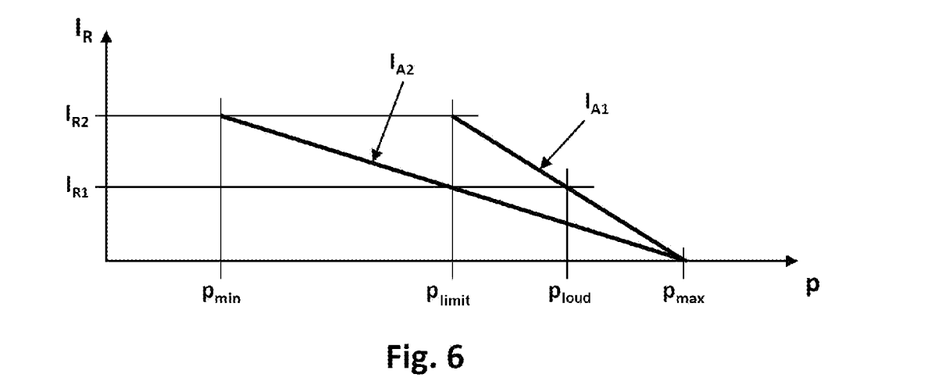
FIG. 6 shows a system pressure/residual current graph, in accordance with one or more embodiments.

FIG. 6 shows a system pressure/residual current graph in which limit values are marked, which limit values are intended to indicate a system pressure at which a discharge of air is found to be too loud or starting from which the discharge of air is not found to be further disturbing.

The graph shows a minimum system pressure $p_{min}$, a maximum system pressure $p_{max}$ and, between them, an acoustic limit pressure $p_{limit}$, where a pressure $p_{loud}$ which is classified as loud is situated to the right of said limit pressure.

The prevailing system pressure is critical if, after a rise phase or holding phase, the rest of the switching current intensity is intended to be reached for completely opening the solenoid valve. When the switching current intensity is reached, the magnet armature opens completely. Therefore, a surge which is produced during the discharge of air and is found to be too loud can occur when the system pressure is still too high. On account of valve tolerances, complete opening can result at different residual current values $I_{R1}/I_{R2}$.

A first residual current rise $I_{A1}$ shows the residual current rise starting from the maximum system pressure $p_{max}$ to a first residual current value $I_{R1}$. At $I_{R1}$, the existing system pressure $p_{loud}$ is still so high that the discharge of air is found to be too loud with the solenoid valve completely open. A system pressure $p_{limit}$ which represents an acoustic limit value below which the discharge of air is not found to be too loud when the solenoid valve is completely opened can be reached only when, starting from the maximum system pressure $p_{max}$, the residual current rise is still so large that it can rise to a second residual current $I_{R2}$ which is greater than the first residual current $I_{R1}$.

In the case of an incorrect definition of the residual current rise, the acoustic discharge limit value can be exceeded depending on the valve tolerance position. In order to avoid this, the rise times and holding times have to be such that, even in the case of a valve with a small residual switching current, the system pressure has already been reduced to such an extent that the acoustic discharge limit value is complied with.

This is depicted, for example, by the second residual current rise $I_{A2}$. Although the slow residual current rise $I_{A2}$ to the first residual current value $I_{R1}$ requires a long function time, a sufficient quantity of pressure medium escapes as leakage starting from the maximum system pressure $p_{max}$, as a result of which the desired acoustics produced during the discharge of air are complied with. In the case of a valve with a high residual current value $I_{R2}$, this slow actuating rise $I_{A2}$ is not critical for the acoustic discharge limit value since it has already been complied with until the residual current rise is reached at a minimum residual system pressure $p_{min}$.

The total function time can be reduced by way of the residual current value being calibrated in line with the function $I_R=f(p)$ for each valve and therefore the rise times and holding times can be optimized to short function times. This calibration can take place once during the production process of the compressed-air installation. However, changes in the tolerances over the service life are not compensated for in this way. Therefore, the calibration can also take place continuously during operation of the compressed-air installation if pressure measurement is provided in the system, as a result of which changes over the service life can be identified and compensated for.

The above description is intended to be illustrative, and not restrictive. Many other embodiments will be apparent to those of skill in the art upon reading and understanding the above description. Embodiments discussed in different portions of the description or referred to in different drawings can be combined to form additional embodiments of the present application. The scope should, therefore, be determined with reference to the appended claims, along with the full scope of equivalents to which such claims are entitled.

LIST OF REFERENCE SIGNS

1 Compressed-air installation
2 Air compressor
3 Discharge valve
4 Air springs
5 Air dryer
6 Pressure accumulator
7 Switchover valve device
8 Main line
9 Discharge line 20 Solenoid valve
21 Magnet core
22 Magnet armature
23 Coil
24 Return spring
25 Yoke body
26 Magnet sleeve
27 Damper element
28 Yoke ring
29 Valve seat
30 Passage bore
31 Valve closing body
32 Valve sleeve
33 Valve receiving apparatus
34 Input side
35 Output side
A Atmosphere
I Actuating current
$I_1$ First rise current final value
$I_2$ Second rise current final value
$I_3$ Third rise current final value
$I_{A1}$ First residual current rise
$I_{A2}$ Second residual current rise
$I_{R1}$ First residual current value
$I_{R2}$ Second residual current value
$I_{S(p)}$ Switching current
M Motor
$p_A$ Atmospheric pressure
$p_{limit}$ Acoustic limit pressure
$p_{loud}$ Loud system pressure
$p_{min}$ Minimum system pressure
$p_{max}$ Maximum system pressure
S Control unit
SL Signal line
SV1 Actuating current profile 1
SV2 Actuating current profile 2
$t_0$ Start time
$t_1$ First time
$t_2$ Second time
$t_3$ Third time
$t_4$ Fourth time
$t_5$ Fifth time
$t_6$ Sixth time
$t_7$ Seventh time
TA1 First rise phase
TA2 Second rise phase
TA3 Third rise phase
TA4 Fourth rise phase
TH1 First holding phase
TH2 Second holding phase
TH3 Third holding phase

The invention claimed is:

1. A method for actuating a solenoid valve, the solenoid valve loaded with a pneumatic pressure medium, in order to reduce a pressure applied to the solenoid valve, where the solenoid valve assumes a closed switching position in a deenergized state and assumes a completely open switching position when it is energized with a switching current intensity which is dependent on the applied pressure, the method comprising:
predetermining a first rise current final value, which first rise current final value is smaller than the switching current intensity;
energizing the solenoid valve with an actuating current which follows an actuating current profile of a period of time over which the actuating current is actuated, and wherein the actuating current profile comprises a first rise phase occurring between a first time and a second time within the period of time;
increasing the actuating current to the predetermined first rise current final value during the first rise phase; and
holding the actuating current constant at the first rise current final value during a first holding phase between the second time and a third time within the period of time, where the first holding phase follows the first rise phase.

2. The method as claimed in claim 1, wherein the first rise current final value is determined depending on the pressure which is applied to the solenoid valve.

3. The method as claimed in claim 2, further comprising measuring the pressure at a beginning of the actuating current profile and/or during the holding phase.

4. The method as claimed in claim 1, wherein the first rise current final value is prespecified.

5. The method as claimed in claim 1, wherein the actuating current is increased in a linear manner or in an abrupt manner during the first rise phase.

6. The method as claimed in claim 1, wherein a duration of the first rise phase between the first time and the second time and a duration of the first holding phase between the second time and the third time is predetermined.

7. The method as claimed in claim 1, wherein the actuating current profile comprises a second rise phase which follows the first holding phase.

8. The method as claimed in claim 7, wherein the actuating current is increased to a determinable second rise current final value during the second rise phase.

9. The method as claimed in claim 8, wherein the actuating current profile comprises a second holding phase which follows the second rise phase and in which the actuating current it held constant at the second rise current final value, where the second rise current final value is smaller than the switching current intensity.

10. The method as claimed in claim 7, wherein the actuating current is increased to the switching current intensity in a linear manner or in the form of a jump during the second rise phase.

11. A compressed-air installation comprising:
a solenoid valve loaded with a pneumatic pressure medium in order to reduce a pressure applied to the solenoid valve, wherein the solenoid valve assumes a closed switching position in a deenergized state and assumes a completely open switching position when it is energized with a switching current intensity, the switching current intensity is dependent on the applied pressure;
wherein a first rise current final value is predetermined, which first rise current final value is smaller dun the switching current intensity, where the solenoid valve is energized with an actuating current which follows an actuating current profile of a period of time over which the actuating current is actuated, and wherein the actuating current profile comprises a first rise phase occurring between a first time and a second time within the period of time, in which the actuating current is increased to the predetermined first rise current final value, and, following said first rise phase, a first holding phase between the second time and a third time within the period of time in which the actuating current is held constant at the first rise current final value.

12. The compressed-air installation as claimed in claim 11, further comprising an air compressor and at least one pressure medium chamber, when the pressure medium chamber is connected to the air compressor via a pneumatic main line, where the main line is connected to an air discharge line which comprises a discharge valve, where the solenoid valve is the discharge valve.

13. The compressed-air installation as claimed in claim 11, wherein the system pressure of the compressed-air installation is applied to an input side of the solenoid valve.

14. The compressed-air installation as claimed in claim 11, wherein there is no muffler.

* * * * *